(12) United States Patent
Furuta

(10) Patent No.: US 6,523,582 B2
(45) Date of Patent: Feb. 25, 2003

(54) AUTOMOBILE FUEL FILLER PORT STRUCTURE

(75) Inventor: Katsumi Furuta, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/085,079

(22) Filed: Mar. 1, 2002

(65) Prior Publication Data

US 2002/0134461 A1 Sep. 26, 2002

(30) Foreign Application Priority Data

Mar. 26, 2001 (JP) ........................................ 2001-088053

(51) Int. Cl.7 ............................................... B60K 15/04
(52) U.S. Cl. ........................ 141/286; 141/382; 220/86.2
(58) Field of Search ................................ 141/286, 312, 141/382; 220/86.2, 86.3

(56) References Cited

U.S. PATENT DOCUMENTS 3,044,270 A * 7/1962 Biever ........................ 62/50.7
5,752,553 A * 5/1998 Kmiecik et al. ............. 141/286
5,860,460 A 1/1999 Hidano et al.
6,330,893 B1 * 12/2001 O'Connell .................... 141/46
6,345,505 B1 * 2/2002 Green ........................... 60/748

FOREIGN PATENT DOCUMENTS

JP 8-91061 A 4/1996
JP 8-238944 A 9/1996

* cited by examiner

Primary Examiner—J. Casimer Jacyna
(74) Attorney, Agent, or Firm—Shinjyu Global IP Counselors, LLP

(57) ABSTRACT

An automobile fuel filler port structure is provided that can improve the fuel filling performance and suppress scattering of the fuel. The automobile fuel filler port structure has a ventilation jacket that is formed between a guide part and the inner surface of a neck section and a plurality of helical swirl grooves that are formed on the surface of the guide part. A recirculation port that recirculates fuel-vapor-containing air during refueling is connected at the outer end of ventilation jacket.

17 Claims, 4 Drawing Sheets

AUTOMOBILE FUEL FILLER PORT STRUCTURE

BACKGROUND OF THE INVENTION

1. Field of the Invention

The present invention relates to a fuel filler port structure for an automobile. More specifically, the present invention relates to an automobile fuel filler port structure that improves the fuel filling performance and that suppresses scattering of the fuel.

2. Background Information

Automobile fuel filler port structures are known that are configured for generating a spiral flow in the poured fuel in order to improve the fuel filling performance. For example, Japanese Laid-Open Patent Publication No. 8-91061 discloses a fuel filler port structure having a flow direction limiting device installed therein to guide the poured fuel in a gyrated direction toward an inner surface of the filler tube. Also Japanese Laid-Open Patent Publication No. 8-238944 discloses a fuel filler port structure having a single spiral groove form on the inner peripheral surface of the filler tube to aid in the fuel filling performance. As a result of such fuel swirling structures, the poured fuel forms a vortex as it flows down the filler tube. Since an air passage that communicates with the space inside the tank is formed at the center of the fuel vortex, the poured fuel flows smoothly into the fuel tank.

There exists a need for an improved automobile fuel filler port structure that improves the fuel filling performance and that suppresses scattering of the fuel. This invention addresses this need in the art as well as other needs, which will become apparent to those skilled in the art from this disclosure.

SUMMARY OF THE INVENTION

It has been discovered that when fuel is poured down a filler tube having a fuel swirling structure, the fuel contacts the inner surface of the filler tube, and thus, frictional resistance develops between the inner surface of the filler tube and the fuel. Consequently, there is a limit to how much fuel filling performance can be improved and there is little hope of improving the fuel filling performance further. Also, the frictional resistance between the inner surface of the filler tube and the fuel causes turbulence in the downwardly flowing fuel such that the amount of fuel scattering increases.

The present invention was conceived in view of these problems with the prior art. Thus, one object of the present invention is to provide an automobile fuel filler port structure that can further improve the fuel filling performance while also suppressing fuel scattering.

The foregoing object can basically be attained by providing an automobile fuel filler port structure, comprising a filler tube, a guide part and a fuel-air vapor recirculation port. The filler tube has a neck section with an inner surface. The guide part has a tubular inner surface extending between a nozzle receiving opening at its inner end and a nozzle insertion regulating hole at its outer end. The guide part is mounted inside the neck section of the filler tube to form a ventilation jacket with a predetermined spacing between an outer surface of the guide part and the inner surface of the neck section. The outer surface of the guide part has a helical swirl groove formed therein. The fuel-air vapor recirculation port is formed at an outer portion end of the ventilation jacket.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
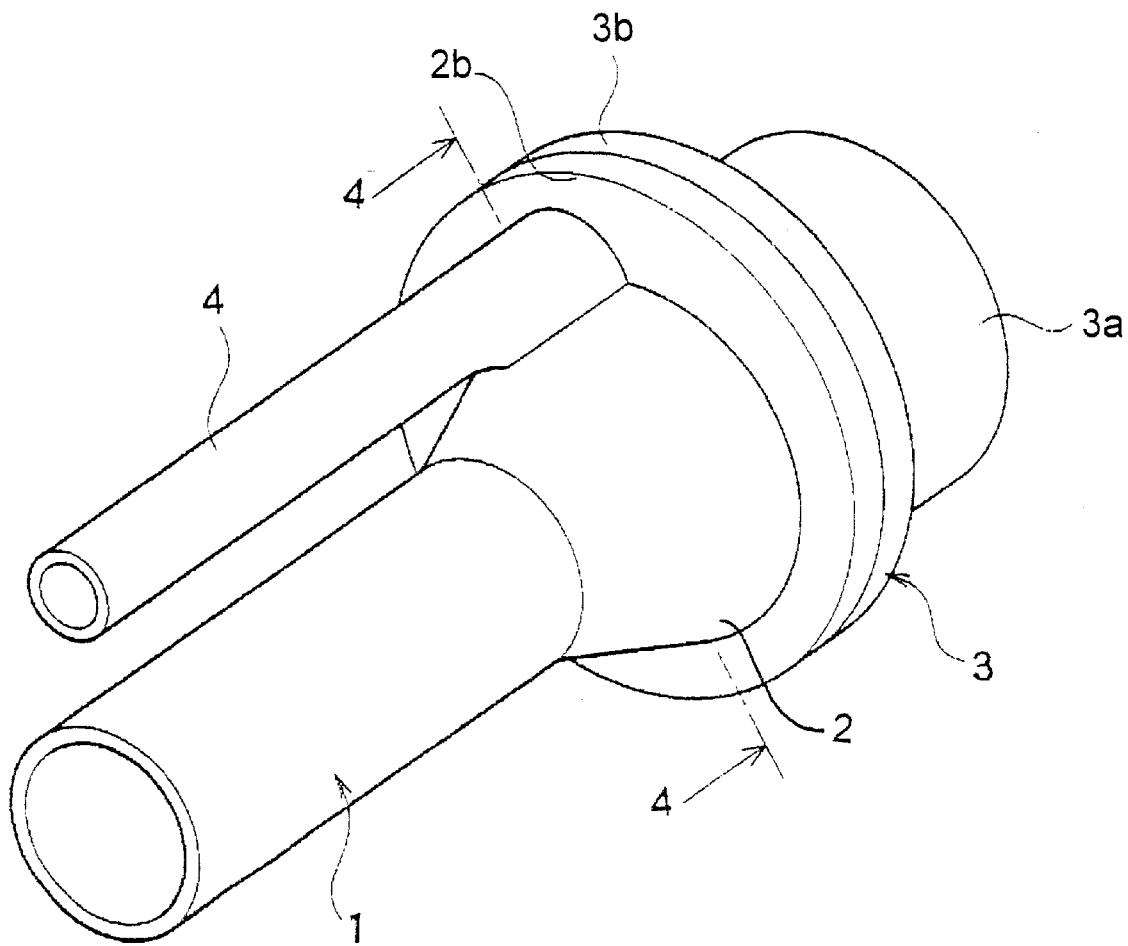
FIG. 1 is a perspective view showing a neck region of an automobile filler tube with a the fuel filler port structure is illustrated in accordance with a first embodiment of the present invention.
Figure 2:
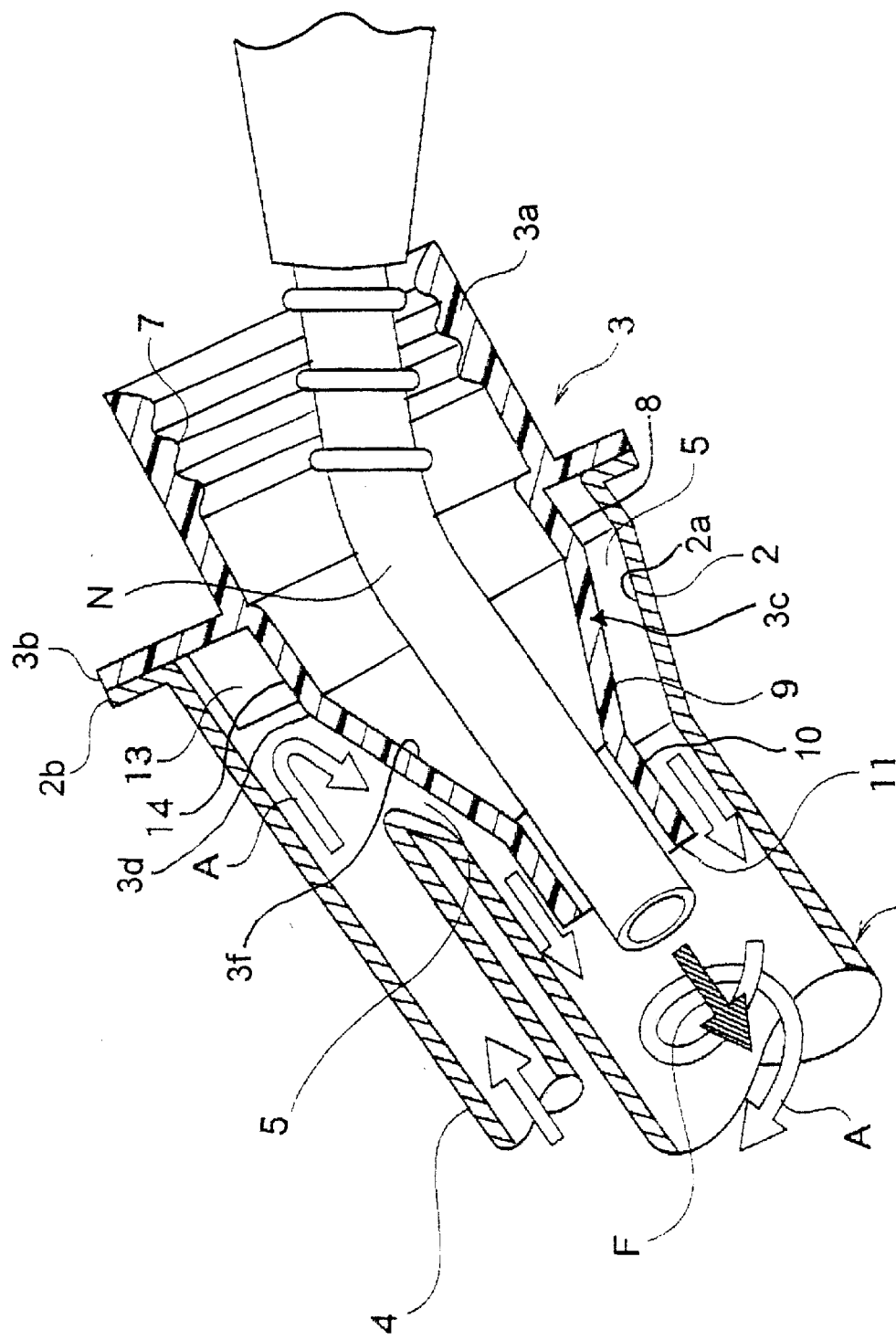
FIG. 2 is a partial longitudinal cross sectional view of the neck region of the filler tube shown in FIG. 1 as viewed along section line 2—2 of FIG. 1.

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Referring to FIGS. 1 to 5, an automobile fuel filler port structure is illustrated in accordance with a first embodiment of the present invention. The automobile fuel filler port structure basically comprises a filler tube 1 having a neck section 2 with an inner surface 2a, a guide part 3 mounted inside the neck section 2 of the filler tube 1, and a fuel-air vapor recirculation port 4 formed at an outer portion end of the filler tube 1. The guide part 3 is a tubular member that basically includes an outer cylindrical part 3a, an annular flange 3b and an inner tapered part 3c. The inner tapered part 3c of the guide part 3 has an outer surface 3d with a plurality of helical swirl grooves 3e and a tubular inner surface 3f. A ventilation jacket 5 with a predetermined spacing is formed between the outer surface 3d of the guide part 3 and the inner surface 2a of the neck section 2. In the figures, shaded arrows indicate the flow of fuel F and unshaded arrows indicate the flow of air A.

In the automobile fuel filler port structure invention of the present invention, the fuel-air vapor returned from the recirculation port 4 during refueling enters the ventilation jacket 5 formed between the inner surface 2a of the neck section 2 and the outer surface 3d of the guide part 3. Then, the fuel-air vapor becomes a helical air current flowing along the swirl grooves 3e formed in the outer surface 3d of the guide part 3. The helical air current encircles the outside of the fuel injected from the refueling nozzle N so as to be disposed between the fuel F and the inner surface 2a of the neck section 2. As a result, the flow of the helical air A causes the fuel F to rotate in a helical form and also reduces frictional resistance between the fuel F and the inner surface 2a of the neck section 2. Since the frictional resistance between the fuel and the inner surface 2a of the neck section 2 is reduced, the fuel filling performance can be improved further and scattering of the fuel can be suppressed.

The neck section 2, which is formed on the outer end of the filler tube 1, tapers larger toward the outside so that the refueling nozzle N can be inserted easily. A flange 2b is formed on the outer end of the neck section 2. The flange 2b is fixed to the refueling port of the vehicle body (not shown).

The guide part 3 is preferably formed from a synthetic resin as a one-piece, unitary member. The guide part 3 is fixedly attached to the neck section 2. Specifically, the flange 3b of the guide part 3 is attached to the flange 2b of the neck section 2. The inner surface 3f of the outer cylindrical part 3a of the guide part 3 has threads 7 formed thereon for screwing a cap (not shown) onto the guide part 3 in a conventional manner.

Figure 3:
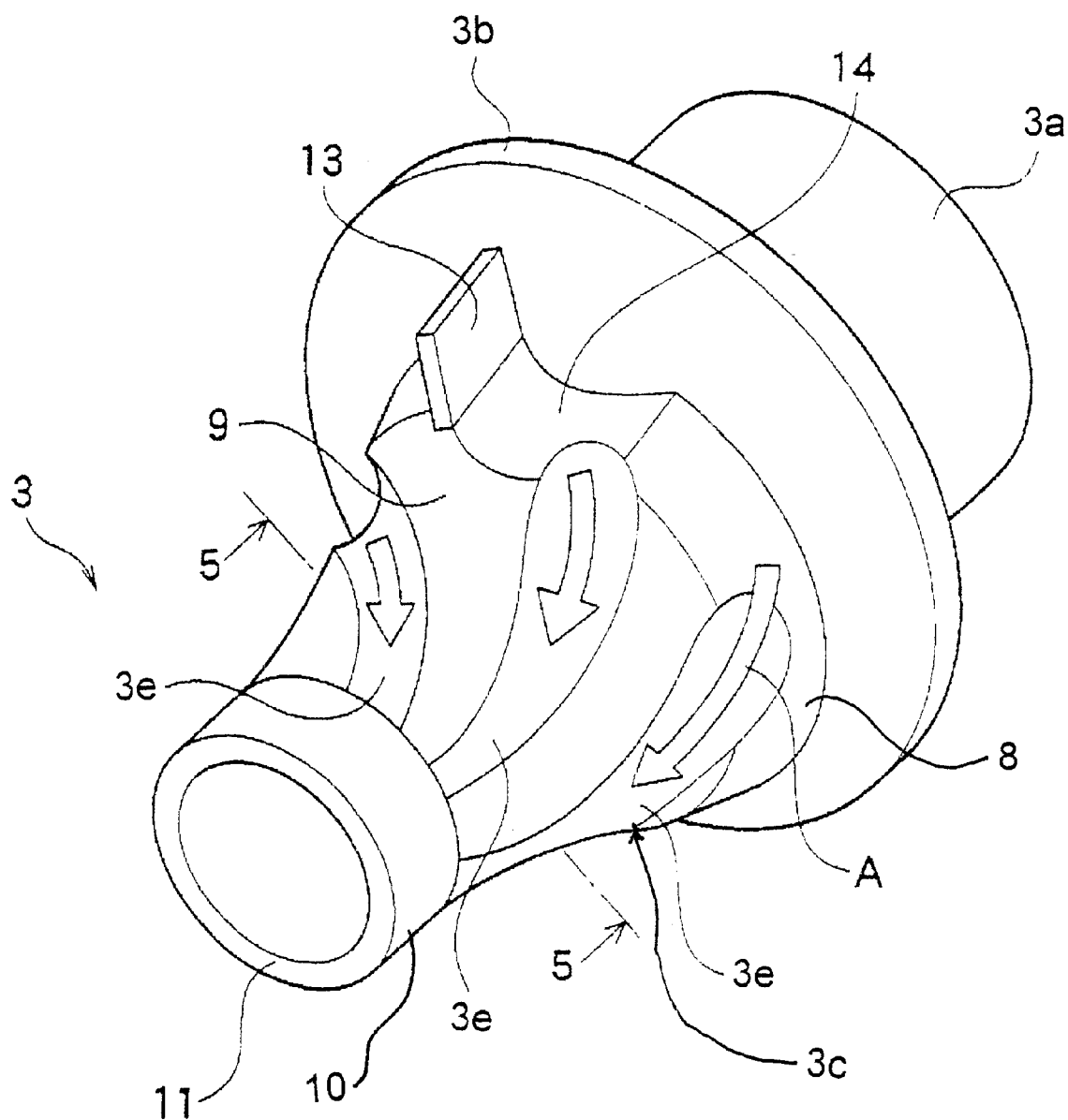
FIG. 3 is a perspective view of the guide part of the filler tube shown in FIG. 2.
Figure 4:
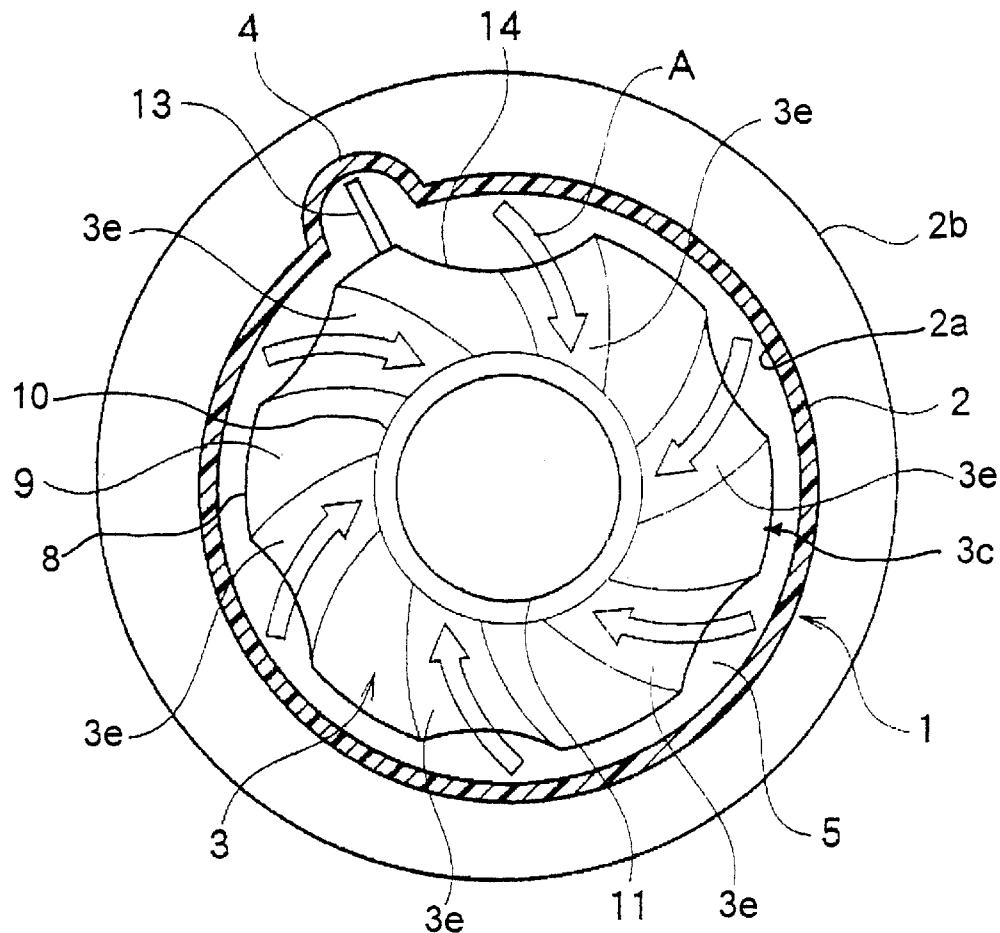
FIG. 4 is a transverse cross sectional view of the filler tube as viewed along section line 4—4 of FIG. 1.
Figure 5:
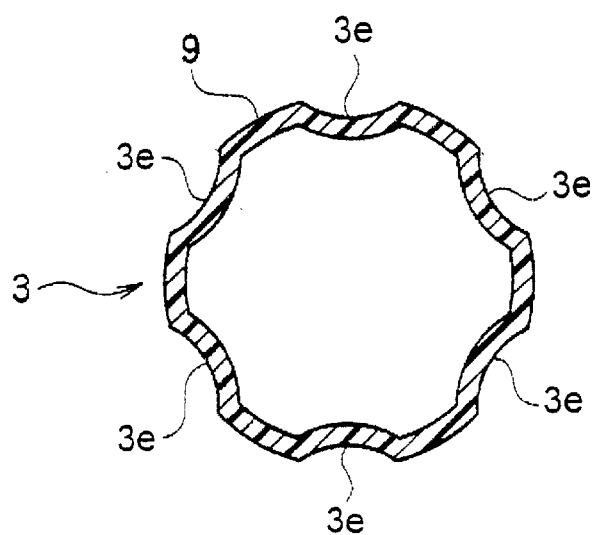
FIG. 5 is a transverse cross sectional view of the guide part of the filler tube as viewed along section line 5—5 of FIG. 3.

The outer cylindrical part 3a of the guide part 3 is formed on the portion of the guide part 3 that extending outwardly from the flange 3b. The inner tapered part 3c of the guide part 3 extends from the inside portion of the flange 3b. The inner tapered part 3c generally follows the shape of the inner surface 2a of the neck section 2. More specifically, the inner tapered part 3c of the guide part 3 has a large cylindrical section 8, a frustoconical section 9, and a small cylindrical section 10. The helical swirl grooves 3e are mainly formed in the frustoconical section 9 as seen in FIG. 3. Preferably, six helical swirl grooves 3e that shift in the counterclockwise direction as one moves in the injection direction of the fuel F are formed on the outer surface 3d of the inner tapered part 3c. The ventilation jacket 5 is formed between the inner tapered part 3c and the neck section 2 with the predetermined spacing formed between the opposed surfaces 2a and 3a. The inner tapered part 3c narrows as it approaches the fuel tank (not shown).

A nozzle insertion regulating hole 11 that is cylindrical in shape is formed on the inside end of the inner tapered part 3c. The nozzle insertion regulating hole 11 has a small diameter roughly matched to that of the refueling nozzle N, and during refueling the space between the nozzle insertion regulating hole 11 and the refueling nozzle N is liquid-sealed by the fuel F injected from the nozzle N. The fuel filling performance improving effect and the fuel scattering suppression effect are large because the nozzle insertion regulating hole 11 of the guide part 3 has a small diameter. The small diameter does not allow air leakage from the gap between the refueling nozzle N and the nozzle insertion regulating hole 11, and thus, almost all of the air from the recirculation port 4 is introduced into the ventilation jacket 5 and joins the helical air current.

Since the portion of the guide part 3 that forms the ventilation jacket 5 tapers to a smaller diameter as it approaches the fuel tank, the helical air current that flows through the ventilation jacket 5 intensifies vigorously in the vicinity of the nozzle insertion regulating hole 11, and thus, can reliably envelop the fuel that is injected from the refueling nozzle N. Moreover, the nozzle insertion regulating hole 11 is cylindrical and parallel (concentric) to a cylindrical portion of the filler tube 1. Thus, the fuel is injected parallel to the filler tube 1 and the outside of the fuel can be enveloped with an air current having a uniform thickness.

In the illustrated embodiment, the recirculation port 4 is a tubular member that is integrally formed with the filler tube 1 as a one-piece, unitary member. Of course, it will be apparent from this disclosure that the recirculation port 4 can be an opening in which a recirculation line is attached.

A flow rectifying plate 13 is installed in a radial orientation on this portion. Since the flow rectifying plate 13 is provided in the section where the recirculation port 4 is connected, the air that returns from the recirculation port 4 can be directed to the swirl grooves 3e without causing turbulence in the flow.

A curved recess 14 is formed in the large cylindrical section 8 of the guide part 3. The recess 14 is positioned in a region located in the counterclockwise direction from the flow rectifying plate 13. In other words, the recess 14 is formed in a region that is positioned in the screw-rotation direction of the swirl grooves 3e from the flow rectifying plate 13. Thus, even more of the air that is returned from the recirculation port 4 can be directed in the screw-rotation direction and the rotational force of the air current can be strengthened.

Since the guide part 3 is made as a one-piece, unitary member from a molded synthetic resin, the swirl grooves 3e, the flow rectifying plate 13, and the recess 14 can be easily formed.

A recirculation port 4 from an onboard refueling vapor recovery (ORVR) device (not shown) for absorbing fuel vapor during refueling is connected to the section where the flow rectifying plate 13 is formed in the ventilation jacket 10 that exists between the neck section 2 and the inner tapered part 3c. The flow rectifying plate 13 is oriented in the flow direction of the fuel-vapor-containing air A flowing inside the recirculation line and serves to prevent turbulence in the flow of air A.

When the refueling nozzle N is inserted into the neck section 2, the tip of the refueling nozzle N is held so that it is parallel to the recirculation port 4 because the nozzle insertion regulating hole 11 is cylindrical.

When the fuel F is sprayed from the refueling nozzle N, the fuel-vapor-containing air A returns from the recirculation port 4 and enters the ventilation jacket 5 between the neck section 2 and the guide part 3. The flow of air A then becomes a helical air current flowing along the swirl grooves 3e formed in the outer surface 3d of the guide part 3.

More particularly, the nozzle insertion regulating hole 11 of the guide part 3 has a small diameter and the space between the refueling nozzle N and the nozzle insertion regulating hole 11 is liquid-sealed by the fuel F. Since the air A does not leak from the space, almost all of the air A from the recirculation port 4 is introduced into the ventilation jacket 5 and joins the helical air current.

Furthermore, since the flow rectifying plate 13 is provided in the section where the recirculation port 4 is connected, the air A from the recirculation port 4 can be introduced into the ventilation jacket 5 without causing turbulence in the flow. Also, since the recess 14 is formed in a region that is positioned in the screw-rotation direction of the swirl grooves 3e from the flow rectifying plate 13, even more of the air A that can be directed in the screw-rotation direction and the rotational force of the air current can be strengthened.

The air current envelops the outside of the fuel F injected from the refueling nozzle N so as to be disposed between the fuel F and the inner surface of the neck section 2. As a result, the air current causes the fuel F to rotate in a helical form and also reduces frictional resistance between the fuel F and the inner surface of the neck section 2. Since the frictional resistance between the fuel F and the inner surface of the neck section 2 is reduced, the filling performance of the fuel F can be improved further and scattering of the fuel F can be suppressed.

Since the portion of the guide part 3 that forms ventilation jacket 5 is the inner tapered part 3c, the helical air current that flows inside the ventilation jacket 5 intensifies vigorously in the vicinity of the nozzle insertion regulating hole 11, and thus, can reliably envelop the fuel F that is injected from the refueling nozzle N.

Additionally, since the nozzle insertion regulating hole 11 is cylindrical and parallel to the filler tube 1, the fuel F is injected parallel to the filler tube 1 and the outside of the fuel F can be encircled in an air current having a uniform thickness.

Although the embodiment described herein has the recirculation port 4 that returns from an onboard refueling vapor recovery (ORVR) device, the invention is not limited to such an arrangement. The requirements of the invention are met so long as there is a recirculation line that returns fuel-vapor-containing air during refueling. For example, it is also acceptable to use a typical recirculation line (vent tube) that returns fuel-vapor-containing air from the space above the fuel in the fuel tank.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-088083. The entire disclosure of Japanese Patent Application No. 2001-088083 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. An automobile fuel filler port structure, comprising:
   a filler tube having a neck section with an inner surface;
   a guide part having a tubular inner surface extending between a nozzle receiving opening at its inner end and a nozzle insertion regulating hole at its outer end, said guide part being mounted inside said neck section of said filler tube to form a ventilation jacket with a predetermined spacing between an outer surface of said guide part and said inner surface of said neck section, said outer surface of said guide part having a helical swirl groove formed therein; and
   a fuel-air vapor recirculation port formed at an outer portion end of said ventilation jacket.

2. The automobile fuel filler port structure as recited in claim 1, wherein
   said guide part is a molded part made of synthetic resin.

3. The automobile fuel filler port structure as recited in claim 2, wherein
   said outer surface of said guide part that forms said ventilation jacket tapers to a smaller diameter as it approaches said nozzle insertion regulating hole.

4. The automobile fuel filler port structure as recited in claim 3, wherein
   said nozzle insertion regulating hole is cylindrical and parallel to said inner surface of said neck section of said filler tube adjacent to said nozzle insertion regulating hole.

5. The automobile fuel filler port structure as recited in claim 4, wherein
   said ventilation jacket includes a flow rectifying plate aligned with said fuel-air vapor recirculation port to receive fuel-air vapor flowing from said fuel-air vapor recirculation port.

6. The automobile fuel filler port structure as recited in claim 5, wherein
   said guide part includes a recess formed in a region of said outer surface of said guide part that is positioned in a screw-rotation direction of said helical swirl groove from said flow rectifying plate.

7. The automobile fuel filler port structure as recited in claim 1, wherein
   said outer surface of said guide part that forms said ventilation jacket tapers to a smaller diameter as it approaches said nozzle insertion regulating hole.

8. The automobile fuel filler port structure as recited in claim 7, wherein
   said nozzle insertion regulating hole is cylindrical and parallel to said inner surface of said neck section of said filler tube adjacent to said nozzle insertion regulating hole.

9. The automobile fuel filler port structure as recited in claim 8, wherein
   said ventilation jacket includes a flow rectifying plate aligned with said fuel-air vapor recirculation port to receive fuel-air vapor flowing from said fuel-air vapor recirculation port.

10. The automobile fuel filler port structure as recited in claim 9, wherein
    said guide part includes a recess formed in a region of said outer surface of said guide part that is positioned in a screw-rotation direction of said helical swirl groove from said flow rectifying plate.

11. The automobile fuel filler port structure as recited in claim 1, wherein
    said nozzle insertion regulating hole is cylindrical and parallel to said inner surface of said neck section of said filler tube adjacent to said nozzle insertion regulating hole.

12. The automobile fuel filler port structure as recited in claim 11, wherein
    said ventilation jacket includes a flow rectifying plate aligned with said fuel-air vapor recirculation port to receive fuel-air vapor flowing from said fuel-air vapor recirculation port.

13. The automobile fuel filler port structure as recited in claim 12, wherein said guide part includes a recess formed in a region of said outer surface of said guide part that is positioned in a screw-rotation direction of said helical swirl groove from said flow rectifying plate.

14. The automobile fuel filler port structure as recited in claim 1, wherein
said ventilation jacket includes a flow rectifying plate aligned with said fuel-air vapor recirculation port to receive fuel-air vapor flowing from said fuel-air vapor recirculation port.

15. The automobile fuel filler port structure as recited in claim 14, wherein
said guide part includes a recess formed in a region of said outer surface of said guide part that is positioned in a screw-rotation direction of said helical swirl groove from said flow rectifying plate.

16. The automobile fuel filler port structure as recited in claim 1, wherein
said guide part includes additional helical swirl grooves formed in said outer surface of said guide part.

17. An automobile fuel filler port structure, comprising:
refueling means for conveying fuel being poured into said refueling means, said refueling means having a tubular neck section with an inner surface;

air input means for inputting the air into said tubular neck section of said refueling means; and fuel swirling means for swirling the air from said air input means around the fuel being poured into said refueling means.

* * * * *